United States Patent [19]

Tiedeman

[11] Patent Number: 5,545,449
[45] Date of Patent: Aug. 13, 1996

[54] POLYETHER-REINFORCED FIBER-BASED MATERIALS

[75] Inventor: George T. Tiedeman, Seattle, Wash.

[73] Assignee: Weyerhaeuser Company, Tacoma, Wash.

[21] Appl. No.: 850,980

[22] Filed: Mar. 12, 1992

Related U.S. Application Data

[63] Continuation-in-part of Ser. No. 770,587, Oct. 2, 1991.

[51] Int. Cl.$^6$ .......................... D21H 17/52; B32B 27/10; B32B 29/08
[52] U.S. Cl. .................. 428/34.2; 428/36.1; 428/36.2; 428/182; 428/260; 428/262; 428/269; 428/274; 428/286; 428/290; 428/413; 428/414; 428/534; 428/535; 162/164.3; 162/168.6
[58] Field of Search ........................ 162/164.1, 164.3, 162/168.1, 168.6; 428/34.2, 413, 414, 534, 535, 536, 537.5, 411.1, 36.1, 36.2, 290, 175, 182, 260, 262, 269, 274, 286; 264/257, 258

[56] References Cited

U.S. PATENT DOCUMENTS

| | | | |
|---|---|---|---|
| 3,129,133 | 4/1964 | Doyle et al. | 162/164.3 |
| 3,451,957 | 6/1969 | Pritchard | 106/245 |
| 3,462,383 | 8/1969 | Longoria, III | 162/164.3 |
| 3,584,072 | 6/1971 | Winslow | 162/164.3 |
| 3,607,598 | 9/1971 | LeBlanc et al. | 428/182 |
| 3,616,163 | 10/1971 | Reisman | 428/182 |
| 3,617,427 | 11/1971 | LeBlanc | 428/182 |
| 3,617,428 | 11/1971 | Carlson | 428/182 |
| 3,617,429 | 11/1971 | LeBlanc | 428/182 |
| 3,619,341 | 11/1971 | Elmer | 428/182 |
| 3,619,342 | 11/1971 | Burke | 428/182 |
| 3,630,834 | 12/1971 | Bremmer | 162/164.3 |
| 3,666,593 | 5/1972 | Lee | 156/285 |
| 3,673,558 | 6/1972 | Toepel et al. | 162/164.3 |
| 3,682,762 | 8/1972 | LeBlanc | 428/182 |
| 3,687,767 | 8/1972 | Reisman et al. | 156/210 |
| 3,697,365 | 10/1972 | Reisman et al. | 428/182 |
| 3,886,019 | 5/1975 | Wilkinson et al. | 156/210 |
| 3,915,783 | 10/1975 | Goppel et al. | 428/413 |
| 4,046,935 | 9/1977 | Wilkinson et al. | 428/182 |
| 4,051,277 | 9/1977 | Wilkinson et al. | 427/288 |
| 4,056,510 | 11/1977 | Symm et al. | 162/164.3 |
| 4,091,167 | 5/1978 | Okada et al. | 428/413 |
| 4,096,305 | 6/1978 | Wilkinson et al. | 428/182 |
| 4,397,909 | 8/1983 | Goddard et al. | 428/262 |
| 4,582,735 | 4/1986 | Smith | 428/34.2 |
| 4,654,100 | 3/1987 | Yats et al. | 162/164.3 |
| 4,656,094 | 4/1987 | Kojima et al. | 428/262 |
| 4,673,616 | 6/1987 | Goodwin | 428/290 |
| 4,740,407 | 4/1988 | Schaefer et al. | 428/290 |
| 4,980,234 | 12/1990 | Almer et al. | 428/414 |
| 5,008,359 | 4/1991 | Hunter | 527/103 |
| 5,258,087 | 11/1993 | Symons | 428/182 |
| 5,292,391 | 3/1994 | Wallick | 156/205 |

FOREIGN PATENT DOCUMENTS

| | | |
|---|---|---|
| 2087423 | 12/1971 | France . |
| 55-6557 | 1/1980 | Japan . |
| 57-95397 | 6/1982 | Japan . |
| 57-95447 | 6/1982 | Japan . |
| 57-182436 | 11/1982 | Japan . |
| 59-47497 | 3/1984 | Japan . |
| 59-112096 | 6/1984 | Japan . |
| 59-179896 | 10/1984 | Japan . |
| 60-224537 | 11/1985 | Japan . |
| 62-152735 | 7/1987 | Japan . |
| 1287829 | 9/1972 | United Kingdom . |
| 1301132 | 12/1972 | United Kingdom . |
| 1408431 | 10/1975 | United Kingdom . |
| WO92/09645 | 6/1992 | WIPO . |

OTHER PUBLICATIONS

TAPPI Test Method No. T 511 om–88, "Folding Endurance of Paper (MIT Tester)." 1988.
TAPPI Test Method No. T 818 om–87, "Ring Crush of Paperboard." 1987.
Specification, drawings, and claims as allowed for U.S. Patent Application Serial No. 07/692,861, filed Apr. 29, 1991, (Inventor: Scott A. Wallick).
"Beef Up Corrugated Board to Hike Boxes Wet Strength," *Package Engineering*, pp. 56–57 (Dec., 1970).
Mithel, "Research in Low–Cost Polymer Reinforcing Proves Applications to Corrugated," *Paperboard Packaging*, pp. 38–48 (Oct., 1973).
Hamerstrand et al., "Starch Xanthides in Linerboard: A Continuous Wet–End Process," *TAPPI* 50: 98A–100A (Aug., 1967).
Morak and Ward, "Cross–Linking of Linerboard to Reduce Stiffness Loss, II. Diisocyanates in Liquid Phase Application," *TAPPI* 53: 652–656 (Apr., 1970).
Morak and Ward, "Cross–Linking of Linerboard to Reduce Stiffness Loss, III. Diisocyanates in Vapor–Phase Application," *TAPPI* 53: 1055–1058 (Jun., 1970).
Morak et al., "Cross–Linking of Linerboard to Reduce Stiffness Loss, IV. Application of Blocked Diisocyanates," *TAPPI* 53: 2278–2283 (Dec., 1970).
Gaul et al., "Novel Isocyanate Binder Systems for Composite Wood Panels," in *Polyurethane: New Paths to Progress, Marketing, Technology, Proceedings of the S.P.T. International Technical/Marketing Conference*, San Diego, CA, Nov. 2–4, 1983, pp. 389–407.

*Primary Examiner*—Ellis P. Robinson
*Assistant Examiner*—Rena L. Dye
*Attorney, Agent, or Firm*—Klarquist Sparkman Campbell & Leigh

[57] ABSTRACT

Polyether-reinforced fiber-based materials, and methods for their manufacture, are disclosed. A representative material is a sheetlike ply having on one or both faces thereof a polyether-impregnated stratum extending depthwise into the ply thickness dimension no greater than about one-half the ply thickness dimension so as to leave a portion of the ply thickness dimension unimpregnated with polyether. The materials can comprise plural superposed plies wherein at least one ply has at least one polyether-impregnated stratum, such as polyether-reinforced corrugated paperboard. The polyether-reinforced materials have excellent compression strength and foldability. Each polyether-reinforced stratum is made by controllably applying a low-viscosity liquid mixture of an epoxy resin and a hardener, wherein the epoxy resin is substantially non-prepolymerized, to a fibrous web surface, then curing the resin mixture. The polyether-reinforced materials can be folded after curing and are useful for making cartons and other products.

23 Claims, 2 Drawing Sheets

POLYETHER-REINFORCED FIBER-BASED MATERIALS

CROSS-REFERENCE TO RELATED APPLICATION

The present application is a continuation-in-part of co-pending U.S. patent application Ser. No. 07/770,587, filed on Oct. 2, 1991, pending.

FIELD OF THE INVENTION

The present invention relates to reinforced fiber-based materials such as reinforced fiberboards and reinforced paperboards, and containers made therefrom.

BACKGROUND OF THE INVENTION

Fiberboards, including corrugated and noncorrugated paperboards, are useful for an extremely wide variety of applications, but particularly for making containers such as packaging and shipping containers. Modern techniques for making such containers involve not only manufacturing the requisite fiberboard material but also cutting and shaping of one or more sheets of the fiberboard into "box blanks" that are folded into the corresponding container shape. Box blanks are typically designed with multiple scored lines and the like so that the blank can be readily formed into a container by merely folding the box blank in an ordered manner along the scored lines. Regardless of the container design, the forming of a substantially planar box blank into a corresponding three-dimensional container involves subjecting the fiberboard to a plurality of folds.

One drawback to many fiberboards, including paperboard, is their poor rigidity when wet. To overcome this shortcoming, manufacturers have tried various ways of reinforcing fiberboard and rendering the fiberboard nonabsorptive for liquids. Examples of such reinforcement include impregnating or coating the fiberboard with paraffin or other polymeric material.

Paraffin coating substantially decreases the tendency of the fiberboard to absorb water, making paraffin-reinforced corrugated paperboard popular for use in packaging vegetables and meats. Unfortunately, paraffin has the disadvantage of being readily softened by moderately elevated temperatures. Also, while paraffin coating can sometimes enhance the compressive strength of the fiberboard and resistance to puncturing, the enhancement may not be sufficient for many uses. In view of the shortcomings of reinforcing fiberboard using paraffin, other polymeric resins, particularly various thermoset materials, have been considered for this purpose. Many cured thermosets have the advantage of being very rigid. As a result, fiberboards reinforced with cured thermosets tend to have high resistance to compression. Unfortunately, many currently favored thermosets are extremely brittle after being fully cured and fracture when subsequently creased or folded. Such fracturing of the thermoset reinforcing agent can readily extend to the fiberboard itself, thereby seriously reducing the integrity of the container made therefrom along edges and at corners.

Phenolics have received the greatest attention, particularly as a reinforcing agent for corrugated paperboard. Representative U.S. Pat. Nos. disclosing use of phenolics include U.S. Pat. Nos. 3,886,019, 4,096,935, 4,051,277, and 4,096,305 to Wilkenson et al. These patents disclose the application of thin films of phenolic resin to surfaces of linerboards and corrugated medium that will be adhered together to form the corrugated paperboard. After adhering together the linerboards and corrugated medium, the corrugated paperboard can be cut, scored, and slotted to make box blanks. Because of the brittleness of the fully cured treated board, full curing of the resin is delayed until after the box blanks have been folded to make cartons.

Various thermoset blends of phenolics with other resins have also been tried in an attempt to reduce the brittleness of phenolic alone. Representative U.S. patents include Reisman et al U.S. Pat. Nos. 3,687,767 (phenolaldehyde), LeBlanc et al. U.S. Pat. No. 3,607,598 (phenol-aldehyde plus polyvinylalcohol), Reisman U.S. Pat. No. 3,616,163 (phenolaldehyde resole), Elmer U.S. Pat. No. 3,619,341 (phenol-aldehyde resole), Burke U.S. Pat. No. 3,619,342 (phenol-aldehyde resole), Reisman et al. U.S. Pat. No. 3,697,365 (resole phenolic plus an organosilyl compound), LeBlanc U.S. Pat. No. 3,682,762 (resole phenolic plus polyaminoalkyl substituted organosiloxane), LeBlanc U.S. Pat. No. 3,617,427 (aminoplast-modified phenol-aldehyde resole), Carlson U.S. Pat. No. 3,617,428 (aminoplast with phenol-aldehyde resole), and LeBlanc U.S. Pat. No. 3,617,429 (aminoplast plus phenol-aldehyde and polyvinylalcohol).

Despite these developments, even phenolic blends tend to be unacceptably brittle, which imposes certain limitations on manufacturing processes. For example, in all the phenolic-blend patents recited above, curing (thermosetting) of the resin is performed only after corrugating the medium fiberboard or even later such as after the corrugated paperboard is scored along fold lines. This means, for example, that resin-coated paperboard destined to become the corrugated medium cannot be cured before it is passed through a corrugating machine. As a result, conventional thermoset-impregnated medium paperboard cannot be made up and cured in one location and supplied to another location for corrugating and incorporation into corrugated paperboard using conventional machinery. Also, interposition of resin-applying and resin-curing machinery into existing production lines for manufacturing corrugated paperboard is expensive. These and other problems with existing methods can result in prohibitively high production and shipping costs.

SUMMARY OF THE INVENTION

According to one aspect of the present invention, a polyether-reinforced fiber-based material is provided which comprises, at least, a single ply of a fibrous material impregnated with polyether on at least one of the faces (i.e., major surfaces) of the ply. Each such impregnation, termed herein a "polyether-impregnated stratum of fibers," extends depthwise from the corresponding face into the thickness dimension of the ply no greater than about one-half the thickness dimension. That is, the ply of fibrous material can have a polyether-impregnated stratum on either or both faces. However, whether a stratum is located on either or on both faces, a portion of the thickness dimension is left unimpregnated with polyether. Therefore, if such a stratum is located on both faces, each stratum has a thickness dimension preferably no greater than about one-third the thickness dimension of the ply.

Each polyether-impregnated stratum of fibers results in part from the application of a liquid resin mixture to the corresponding face of the ply. The resin mixture comprises an epoxy resin (resin "A") and a hardening agent (resin "B"). Unlike conventional epoxy resin mixtures, the "resin mixture" used according to the present invention has a watery consistency as a result of the "epoxy" molecules of resin "A" being in a substantially non-prepolymerized form.

Although the fibers comprising the ply can be any of a wide variety of fibers, including hydrophilic and hydrophobic fibers, they are preferably wood pulp fibers. The fibers are preferably organized into a sheetlike web having a porosity sufficient to absorb a liquid epoxy resin mixture applied to the web for the purpose of forming a polyether-impregnated stratum. Most preferably, the wood pulp fibers are in the form of a paperboard.

Polyether-reinforced fiber-based materials according to the present invention exhibit high ring-crush strengths at low loading levels of polyether. For example, a polyether-reinforced paperboard according to the present invention contains a loading level of polyether of about 5% w/w or less, yet exhibits a ring-crush strength greater than ring-crush strengths of other polymer-reinforced materials, such as phenolic-reinforced materials, having loading levels of polymer at least twice as high.

It has been unexpectedly discovered that the foldability of polyether-reinforced fibrous materials according to the present invention is excellent. All the reasons for such excellent foldability are not understood at this time. One important contributing factor is that the resin mixture applied to the fibrous material according to the present invention is in a "substantially non-prepolymerized" form. As it cures, the molecules comprising resin "A" undergo less extensive crosslinking than conventional "epoxies," thereby producing a polyether that has much less brittleness than polyethers produced using conventional epoxies.

Leaving a portion of the thickness dimension unimpregnated with polyether also contributes in part to the ability of the polyether-reinforced material according to the present invention, despite the fact that the polyether is fully "cured," to be folded and creased without fracturing. This is in contrast to analogous prior-art materials that are generally so brittle that folding, and especially creasing, will cause fracture of the material along the fold line. In fact, certain polyether-reinforced fibrous materials according to the present invention have exhibited foldabilities that are substantially no less than the foldabilities of corresponding fibrous materials without any polyether reinforcement. At a given ring-crush strength, the foldabilities of polyether-reinforced, fiber-based materials according to the present invention are much higher than the foldabilities of prior-art materials having equal ring-crush strengths.

According to another aspect of the present invention, the polyether-reinforced fiber-based material can comprise multiple web plies superposedly adhered together, wherein at least one of the faces of at least one of the plies has a polyether-impregnated stratum. Hence, the present invention encompasses polyether-reinforced "corrugated paperboard" comprising at least one "linerboard" and at least one "corrugated medium paperboard," wherein at least one of said plies has at least one polyether-impregnated stratum. Preferably, but not necessarily, the corrugated medium contains one or more of the polyether-impregnated strata. Such corrugated paperboard can also be comprised of more than one corrugated medium, each sandwiched between and adhered to coextensive linerboards.

The crush resistance and foldability of materials according to the present invention permit the materials to be prepared at one location, including full curing, and used at a different location. For example, it is possible to manufacture polyether-impregnated medium paperboard at one plant and ship the paperboard to a second plant at which the paperboard is corrugated for making into corrugated paperboard. It is also possible for fully cured polyether-reinforced corrugated paperboard according to the present invention to be made at one location, then cut, scored, and folded to make cartons at another location. In other words, the end-user of the material does not have to be concerned with curing the material, in contrast to end-users of analogous prior-art materials.

As another aspect of the present invention, methods are provided for manufacturing such polyether-reinforced fiber-based materials. In a representative embodiment, an epoxy resin mixture is applied to one or both faces of a fibrous web at a loading level that ensures that the resin mixture does not penetrate into the thickness dimension of the web more than about half the thickness dimension (if applied to only one face) or about one-third the thickness dimension (if applied to both faces). Hence, the maximal loading level (the magnitude of which will, of course, depend upon the particular nature of the web) is dictated by the necessity to leave a portion of the thickness dimension of the web unimpregnated with the resin mixture. Although heat and pressure are not required to cure the resin mixture, curing preferably occurs by application of heat and pressure.

DETAILED DESCRIPTION

Figure 1:
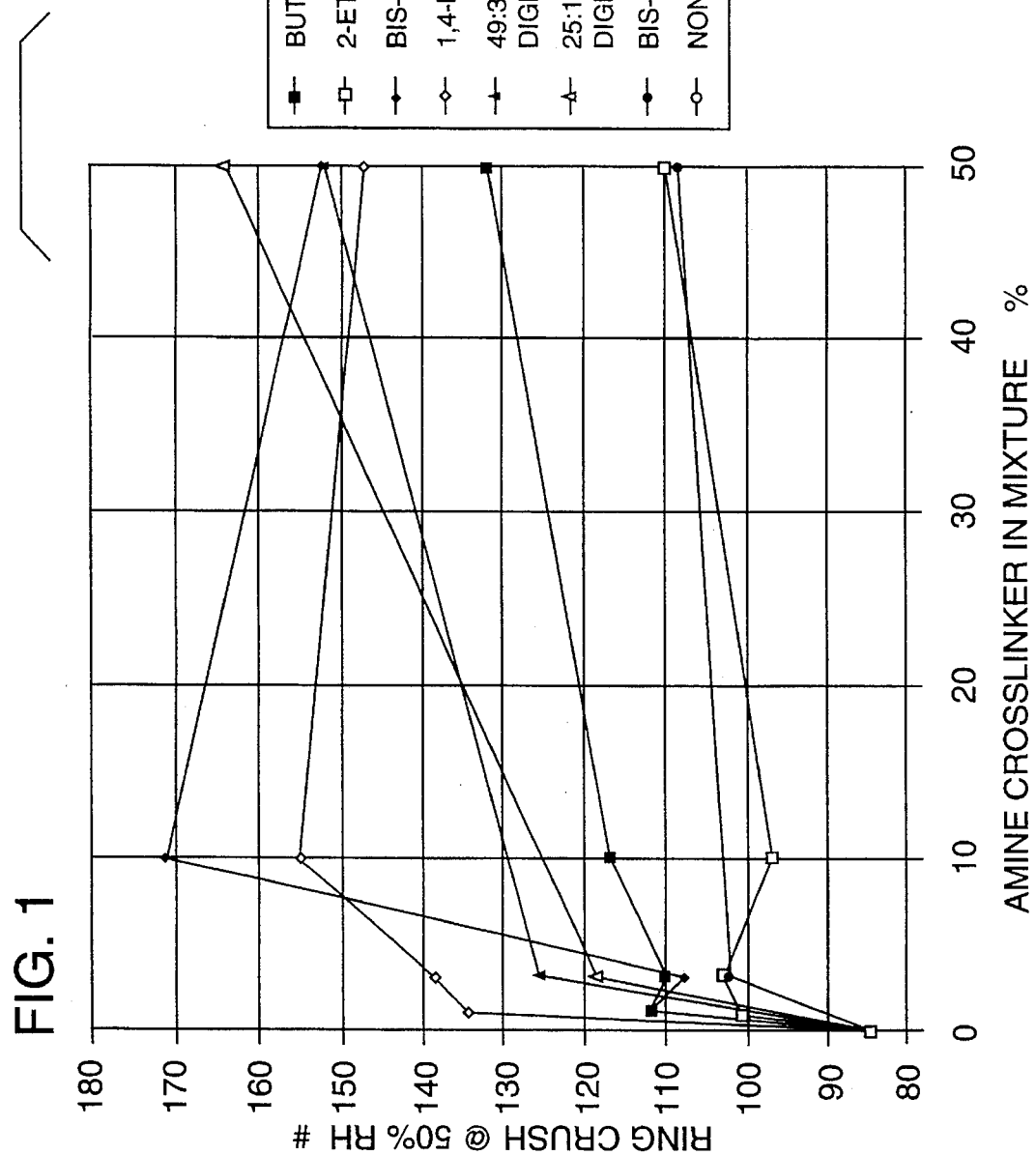
FIG. 1 comprises plots of ring-crush strengths of polyether-reinforced paperboards according to the present invention as a function of the amount of "hardener" (crosslinker) added to the resin mixture applied to the paperboards.

In a method according to the present invention, a liquid epoxy resin mixture is controllably applied to either the obverse face or the reverse face, or both faces, of a porous, sheetlike fibrous web. The resin mixture is subsequently cured to transform each epoxy-impregnated face into a polyether-impregnated stratum. Each polyether-impregnated stratum does not extend through the thickness dimension of the web. In other words, even if the web possesses a polyether-impregnated stratum on both faces, the web still retains a non-impregnated stratum within the thickness dimension of the web.

As referred to herein, a "porous, sheetlike fibrous web" can comprise woven or nonwoven fibers. Consistent with a sheetlike conformation, such a web has a length dimension, a width dimension, an obverse face, a reverse face parallel to the obverse face, and a thickness dimension extending between the obverse and reverse faces. As is typical with fibrous webs, the thickness dimension is porous.

Representative fibers, not intended to be limiting, comprising the web are hydrophilic fibers such as cellulosic fibers (e.g., cotton, wood pulp, rayon), carbohydrate fibers, polyvinyl alcohol fibers, substituted cellulosic fibers, glass fibers, mineral fibers, proteinaceous fibers (e.g., silk); and hydrophobic fibers such as sized wood pulp, cotton, or rayon fibers, polyethylene fibers, polypropylene fibers, polyester fibers, nylon fibers, polyvinylacetate fibers, treated glass fibers, and aramid fibers; and mixtures of these fibers. If the fibers are synthetic polymeric fibers, the fibers can be spun-bonded or heat-bonded.

A "polyether-reinforced fiberboard" is a product according to the present invention made from a sheetlike web of fibers. When the sheetlike web used to make the fiberboard is comprised substantially of wood pulp fibers, the product is referred to as a "polyether-reinforced paperboard."

By way of example and not intended to be limiting, representative basis weights of webs comprising wood pulp fibers (i.e., "paperboards") range from about 10 to about 90 pounds per thousand square feet. It will be appreciated that, since different fiber materials have different specific gravity values and since webs made from different fiber materials may have different densities, suitable basis weight ranges for other types of fibers may be different from the stated range for wood pulp fibers.

A "resin mixture" as used herein is a liquid formulation comprising a mixture of a resin "A" and a resin "B." Resin "A" is an epoxy resin comprising molecules having an aliphatic (straight or branched), alicyclic, aromatic, or aliphatic-aromatic core group. The molecules have at least one terminal glycidyl

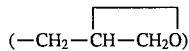

group. A wide range of such compounds are known in the art. Examples, not intended to be limiting, include glycidyl esters; glycidyl ethers such as butyl glycidyl ether and 2-ethylhexyl-glycidyl ether; diglycidyl esters; and diglycidyl ethers such as 1,4-butanediol-diglycidyl ether and bis-phenol A-diglycidyl ether. Resin "A" can comprise a mixture of these various glycidyl compounds.

Resin "A," unlike the "resin" component of, for example, a conventional epoxy "cement," is substantially non-prepolymerized. That is, the glycidyl compounds comprising resin "A" exist predominantly as monomers and short oligomers, such as dimers and trimers, rather than longer polymeric forms typical of conventional epoxy cements. As a result, resin "A" has a watery viscosity in contrast to the syrupy consistency of epoxy "cement" resins.

Resin "B," which also has a watery consistency, comprises a "hardening" or "curing" agent for resin "A." Resin "B" can be any of a wide variety of such agents known in the art for curing ("thermosetting") epoxies. Representative curing agents, not intended to be limiting, include polyamines, polyimines, phenols, carboxylic acids and anhydrides, mercaptans, and cationic photo-initiators such as diaryliodonium salts and triarylsulfonium salts. Resin "B" can comprise a mixture of various epoxy thermosetting compounds. Preferably, polyamines such as diethylenetriamine ("DETA") or triethylenetetramine ("TETA") are used.

The resin mixture is prepared by combining resin "A" with resin "B" to yield a substantially homogeneous mixture thereof. Whereas virtually any amount of resin "B" can be added to resin "A," the best structural properties are obtained when the amount of resin "B" in the mixture is no greater than the amount of resin "A" in the mixture. After combining resin "A" with resin "B," any of various known agitating or mixing means can be employed to create a substantially homogeneous mixture of the resins. Resins "A" and "B" can also be combined together into a substantially homogeneous mixture by any of the various known continuous processes adapted for this purpose.

Mixtures of resins "A" and "B" have a watery consistency when prepared. That is, such mixtures have a viscosity typically less than 500 centipoise and preferably 200 centipoise or less.

The resin mixture is preferably applied in a neat (undiluted) form to the web. Since the resin mixture is watery, it penetrates readily into virtually any porous fibrous material. However, a diluent miscible with the resin mixture can be added thereto if required to facilitate penetration of the resin into unusually dense fibrous webs. Any organic liquid that is non-reactive with epoxies can be used as a diluent. Preferably, the diluent is a low molecular weight monoepoxide such as a monoglycidyl ether or monoglycidyl ester, such as glycidyl butanoate. Other suitable diluents include, but are not limited to, propylene carbonate and phthalate esters. If used, the amount of diluent is generally within a range of about 5 to 20% w/w, relative to the mass of the epoxy resin. As a diluent, propylene carbonate has certain beneficial characteristics including substantially odorless, colorless, low viscosity, low toxicity, low vapor pressure at room temperature, and low flammability (boiling point: 242° C.; flashpoint: 132° C.).

Each polyether-impregnated stratum typically extends the length and width dimensions of the web parallel to the obverse and reverse faces of the web. When a polyether-impregnated stratum is located on only one face of the web, the impregnated stratum preferably has a thickness dimension no greater than about half the web thickness dimension and preferably between one-third and one-half the web thickness dimension. When a polyether-impregnated stratum is located on both faces of the web, the strata each have a thickness dimension no greater than about one-third the web thickness dimension. In either case, a portion of the thickness dimension of the web is left unimpregnated with polyether.

Although fully impregnating the thickness dimension of the web may yield a fiber-based material having even greater crush resistance, leaving at least a portion of the thickness dimension of the web without any polyether, according to the present invention, provides a unique combination of crush strength and flexibility. Accordingly, if too much of the thickness dimension is impregnated with polyether, the foldability of the fiber-based material may be less than desirable for certain uses. If too little of the thickness dimension is impregnated, the material may exhibit insufficient crush resistance for certain uses.

As the resin mixture is applied to the web, it absorbs rapidly into the pores of the thickness dimension of the web. The depth of absorption is controlled by precisely controlling the "loading" of the resin mixture on the surface of the web. As used herein, "loading" and "loading level" refer to the mass of resin mixture (or the mass of polyether, after the epoxy resin is cured) applied to a face of the web, relative to the mass of the web. Of course, a particular loading level of resin mixture will penetrate to different depths in the thickness dimensions of different webs, including webs made of different fibers. Hence, different webs can accommodate different loading levels before the requisite penetration limits are exceeded. By way of example, not intended to be limiting, most paperboards can be loaded with up to about 20% w/w resin mixture without the resin excessively penetrating the thickness dimension of the paperboard. Preferably, paperboards are loaded with 10% w/w resin mixture or less for maximal economy. For any type of web, simple cross-sectional examination of the thickness dimension of an impregnated web using a microscope or other suitable examination instrument will enable one to readily determine the particular loading level that will produce a particular depth of penetration of the resin.

It will be appreciated that controlling the loading level involves applying the resin mixture in a manner whereby the mass of resin mixture applied per unit area of the web is precisely controlled. The resin mixture can be applied to the web by any of various liquid-application methods including, but not limited to, gravure printing, roller coating, and spraying using apparatuses having one or a plurality of spraying orifices. A preferred application method is gravure printing because it has been found that this method provides precise control of resin loading on the web surface.

It will also be appreciated that polyether-reinforced webs according to the present invention can be prepared by either a batch process or a continuous process. Since various apparatuses capable of performing either process are well known in the art, they will not be described further herein.

"Curing" (or "hardening" or "thermosetting") an epoxy resin converts the molecules therein to a polyether which is a type of thermoset material. Curing of the resin mixture used according to the present invention occurs via crosslinking reactions of the glycidyl moieties in resin "A" with the molecules of hardening agent comprising resin "B."

Curing can occur at room temperature, but the time required (for self-cure) may be inconveniently long. One way to increase the rate of curing is to increase temperature and/or pressure. However, the curing temperature must not be so high that damage to the resin mixture, polyether, or web results. A general range for curing temperature is room temperature (25° C.) up to about 200° C. A general range for curing pressure is zero up to about 1000 psig. With paperboards to which the resin mixture has been applied, curing is preferably conducted at about 150° C. and about 800 psig for a time from about four seconds to about five minutes. The preferred curing time at 150° C. and 800 psig is about 5 minutes. Of course, since elevated temperature and pressure increase the rates of the curing reactions, the higher the temperature and/or pressure, the less time required to achieve the same degree of cure.

Curing by application of heat and pressure offers the additional benefit of compressing the web(s) during curing, which has been found to increase the crush resistance of the polyether-reinforced material over the crush resistance of similar material produced at the same loading level but without application of heat and pressure. Nevertheless, curing without compression tends to produce polyether-reinforced materials according to the present invention that exhibit better fold resistance than materials cured with compression. Fold resistance is also better with thinner materials (since fold resistance is a measure of stiffness which is a function of Young's modulus x thickness. Young's modulus increases with increased compression, but does not increase proportionately with the decrease in material thickness resulting from curing under compression.

Curing at elevated temperatures and pressures can be effected using any of various devices known in the art for controllably applying heat and pressure. Candidate curing devices include, but are not limited to, platen presses and continuous belt presses. If necessary or desired, curing can be performed by a regimen that includes two or more short applications of pressure rather than a continuous application for the entire time required to achieve full cure.

A polyether-reinforced fiber-based material according to the present invention comprises at least one fibrous sheetlike web. When the polyether-reinforced fiber-based material is comprised of only one web or "ply," the ply comprises at least one substantially continuous polyether-impregnated stratum of fibers located within the thickness dimension of the web. The impregnated stratum can be located on either the obverse or reverse face of the web or on both faces.

A polyether-reinforced fiber-based material according to the present invention can also be comprised of multiple plies. In such multiple-ply materials, it is not necessary that all the plies have a polyether-impregnated stratum. The present invention encompasses multiple-ply materials wherein only one ply thereof has at least one polyether-impregnated stratum. The present invention also encompasses multiple-ply materials wherein multiple plies each have at least one polyether-impregnated stratum. Each stratum need not have the same loading level.

In multiple-ply materials according to the present invention, each ply can be made from the same or a different fibrous web. The webs need not all have the same basis weight, thickness, porosity, or texture.

When the polyether-reinforced fiber-based material is comprised of more than one ply, the plies are typically superposedly adhered together. Adhering the plies together can be achieved by adhering non-impregnated faces to non-impregnated faces, non-impregnated faces to impregnated faces, and impregnated faces to impregnated faces. The outermost faces of such multiple-ply materials need not be polyether-impregnated faces.

One example, not intended to be limiting, of a multiple-ply material according to the present invention is a corrugated paperboard wherein at least one of the plies thereof has at least one polyether-impregnated stratum. As used herein, a "corrugated paperboard" is a widely recognized product comprising at least two plies of paperboard adhered together, where at least one of said plies is corrugated in a manner known in the art. The corrugated ply is generally referred to as the "medium" paperboard. At least one of said plies is not corrugated and is used as a facing sheet for the corrugated paperboard. Hence, the non-corrugated ply is termed a "linerboard." Typical corrugated paperboards are comprised of a corrugated medium sandwiched between two linerboards adhered to the corrugated medium. The linerboard(s) of a corrugated paperboard often have a larger basis weight than the corrugated medium. Any suitable adhesive can be used to adhere the linerboards to the corrugated medium. A corrugated paperboard can also comprise multiple plies of corrugated medium separately interposed between plies of linerboards. Corrugated paperboards are widely used for making cartons and the like.

Since curing can occur at moderate temperatures, curing of the resin mixture applied to a paperboard could be performed according to the present invention simultaneously with corrugation of the paperboard. This is because conventional corrugators impart a certain amount of heat and pressure to the paperboard as the paperboard passes through the corrugator. Simultaneous curing and corrugation can be advantageous when making polyether-impregnated corrugated medium according to the present invention because conventional process machinery can be readily and inexpensively adapted to include a gravure coater, sprayer, or the like without the need to add a separate curing device. In such an instance, the gravure coater, sprayer, or the like is added to the process machinery upstream of the corrugator. As the paperboard to which the resin mixture has been applied passes through the corrugator, the resin mixture may undergo curing simultaneously with impression of corrugations into the paperboard.

Curing can also occur at ambient temperatures. I.e., the resin mixture can undergo a "self-cure." As a result, it is not necessary to cure the resin mixture on-line after applying the resin mixture to the web. For example, it is possible to apply the resin mixture to a paperboard, corrugate the paperboard, then allow the resin mixture to self-cure off-line.

As can be appreciated from the foregoing, the polyether imparts a substantial reinforcement to a fibrous web, enabling the polyether-reinforced web to exhibit a crush-resistance strength that is greater than the crush-resistance strength of a corresponding non-reinforced web. Hence, with products made from a polyether-reinforced web produced according to the present invention, lesser amounts of fibrous web are required to obtain a crush resistance equal to the crush resistance of similar products made from non-reinforced web, which can yield considerable savings in cost and weight while adding other benefits such as wet strength.

It has unexpectedly been found that fiber-based materials reinforced with at least one polyether-impregnated stratum according to the present invention have excellent fold resistances. In fact, in certain instances, the fold resistance of a polyether-reinforced web according to the present invention is as good as a non-reinforced web. Thus, the present invention makes it possible to substantially increase the crush resistance of a fiber-based material without adversely affecting the fold resistance of the material. Furthermore, reinforcing a fiber-based material with polyether according to the present invention yields greater flexibility at a given crush strength than exhibited by prior-art reinforced fiber-based materials.

A key benefit of greater flexibility at equal strength is that it is possible for cartons and the like to be made from fully cured polyether-reinforced corrugated paperboard produced according to the present invention, including such operations as cutting and folding, without the paperboard breaking along cut and fold lines.

Polyether-reinforced fiber-based materials according to the present invention can be adhered together using conventional adhesives. In part, this is because the polyether impregnant is not present through the entire thickness dimension of the web, as described above. For example, reinforced corrugated paperboards can be assembled from a corrugated medium and at least one linerboard (wherein at least one of the medium and linerboards are polyether-reinforced according to the present invention) using conventional water-borne adhesives such as starch-based adhesives, latex-based adhesives, or latex-starch adhesives to adhere nonimpregnated surfaces together. Alternatively, if desired, conventional non-water-borne adhesives can also be used on either non-impregnated or impregnated surfaces. Such non-water-borne adhesives include, but are not limited to, hot-melt adhesives, polyurethanes, isocyanates, epoxies, rubber-based adhesives, various solvent-borne polymers, mastics, and silicones.

Additional benefits of polyether-reinforced fiber-based materials according to the present invention include:

(a) Wet resistance: the materials retain crush resistance even when wet, which is of considerable benefit when the materials are employed in making shipping cartons.

(b) Resistance to fracture, even after being folded a number of times. Such resistance is due in part to the unexpectedly superior flexibility of polyether (prepared from a resin mixture containing a substantially non-prepolymerized epoxy resin) as a reinforcing agent and in part to the fact that the polyether impregnant does not extend entirely through the thickness dimension of the web. Hence, the non-impregnated portion of the web can serve as a hinge during folding, even after a lengthy series of folds. As stated above, the improved folding resistance is obtained, however, when resin "A" is not pre-polymerized. It has been found that conventional "epoxy" reinforcing agents made with pre-polymerized resins do not yield good fold resistance, as disclosed in co-pending U.S. patent application Serial No. 07/770,587, incorporated herein by reference.

A polyether-reinforced fiber-based material according to the present invention also has potential uses other than packaging and storage containers including, but not limited to, various laminates, skins, and facings for paneling, plywood, and other construction materials; wall coverings; and analogous uses.

In order to further illustrate the invention, the following examples are provided.

EXAMPLES 1–23

In these examples, the ring-crush strengths (edgewise compression resistance) and foldabilities of paperboard materials treated according to the present invention (i.e., containing a polyether-impregnated stratum) were determined. Ring-crush strength is an accepted measure of the crush resistance of sheetlike objects. The ring-crush tests were performed according to the TAPPI T818-OM-87 standard test procedure.

Folding endurance tests were performed on strips ½ inch wide and 6 inches long according to the TAPPI T511-OM-83 standard test procedure. Briefly, the folding endurance test comprises holding one end of a test strip in a stationary position and applying a one-kilogram weight to the other end. While applying the weight, the length of the strip between the ends is repeatedly flexed over a 270° arc until the strip breaks. Data are recorded as the number of flexes until break.

The paperboard selected for these tests was a 42-pound basis weight Kraft linerboard. Separate sheets of the linerboard measuring 12 inches by 12 inches were treated individually on one face with a resin mixture according to the present invention at a corresponding loading level as listed in Table I. Ten sample strips were ring-crush and foldability tested for each example; each datum in Table I represents a sample mean where n=10.

TABLE I

| Example | Resin "A" | Parts of Resin "A" | Resin "B" | Parts of Resin "B" | Load % | Ring Crush (lbs) | Folds | Caliper (mil) |
|---|---|---|---|---|---|---|---|---|
| 1 | Butyl glycidyl ether | 99 | DETA | 1 | 5.2 | 112 | 2863 | 9.4 |
| 2 | " | 97 | " | 3 | 5 | 110 | 1598 | 9.6 |
| 3 | " | 90 | " | 10 | 7.2 | 117 | 2301 | 9.3 |
| 4 | " | 50 | " | 50 | 6 | 132 | 1564 | 9.3 |
| 5 | 2-ethylhexyl glycidyl ether | 99 | " | 1 | 4.9 | 101 | 2725 | 9.2 |
| 6 | " | 97 | " | 3 | 4.8 | 103 | 2516 | 9.5 |
| 7 | " | 90 | " | 10 | 4.5 | 97 | 2772 | 9.2 |
| 8 | " | 50 | " | 50 | 6 | 110 | 2259 | 9.5 |

TABLE I-continued

| Example | Resin "A" | Parts of Resin "A" | Resin "B" | Parts of Resin "B" | Load % | Ring Crush (lbs) | Folds | Caliper (mil) |
|---|---|---|---|---|---|---|---|---|
| 9 | bis-phenol A diglycidyl ether | 99 | " | 1 | 4.9 | 112 | 1648 | 9.8 |
| 10 | " | 97 | " | 3 | 5 | 108 | 2736 | 9.4 |
| 11 | " | 90 | " | 10 | 4.8 | 171 | 1229 | 9.3 |
| 12 | " | 50 | " | 50 | 4.9 | 152 | 1662 | 9.4 |
| 13 | 1,4-butanediol diglycidyl ether | 99 | " | 1 | 4.8 | 135 | 2122 | 9.3 |
| 14 | " | 97 | " | 3 | 5.1 | 139 | 1846 | 9.5 |
| 15 | " | 90 | " | 10 | 5.2 | 155 | 1670 | 9.6 |
| 16 | " | 50 | " | 50 | 5.1 | 147 | 1724 | 9.3 |
| 17 | 49:34 bis-phenol A/1,4 butanediol diglycidyl ethers | 83 | " | 3 | 5.6 | 126 | 1885 | 9.3 |
| 18 | 49:34 bis-phenol A/1,4 butanediol diglycidyl ethers | 43 | " | 50 | 5.3 | 152 | 1383 | 9.8 |
| 19 | 25:18 bis-phenol A/1,4 butanediol diglycidyl ethers | 83 | " | 3 | 5.6 | 119 | 1681 | 9.3 |
| 20 | 25:18 bis-phenol A/1,4 butanediol diglycidyl ethers | 43 | " | 50 | 4.7 | 164 | 1937 | 9.7 |
| 21 | bis-phenol A diglycidyl ether | 97 | TETA | 3 | 4.9 | 102 | 2299 | 9.5 |
| 22 | " | 50 | " | 50 | 4.8 | 108 | 1547 | 9.6 |
| 23 | untreated control | 0 | — | 0 | — | 85 | 2204 | 9.7 |

The resin mixtures were applied to the sheets using a gravure coater. The resin mixture was cured by heating the treated sheets at 150° C., 800 psig for about 5 minutes.

After curing, the treated sheets were cut parallel to the machine direction of the sheets into strips ½-inch wide and 6 inches long using a precision cutter. For ring-crush testing of each example, representative strips from each example were individually rolled end-to-end into a cylinder and placed into a specimen holder manufactured by Sumitomo Corp., Chicago, Ill. The holder with the test "cylinder" was then mounted on the lower platen of a conventional machine adapted for applying a compressive force. A progressively increasing axially compressive force was applied by the machine until the cylinder experienced compressive failure. The compressive force in pounds was recorded at time of failure. All tests were performed at 50% relative humidity. The experimental control comprised similar compressive tests performed using the same but untreated sheets.

Results of the ring-crush and fold-resistance tests are tabulated in Table I. Ring-crush data are also plotted in FIG. 1, showing ring-crush at 50% relative humidity as a function of percent amine crosslinker (i.e., resin "B"; DETA or TETA in these tests) in the resin mixture applied to the sheets.

Turning first to the ring-crush data, it can be seen (FIG. 1 and Table I) that treating the paperboard sheets according to the present invention yielded polyether-reinforced paperboard sheets exhibiting appreciably greater ring-crush strengths than untreated controls (ring-crush data typically varied 1–5% from sample means; loading levels were generally about 5%). With both monoglycidyl and diglycidyl ethers, increasing the amount of amine crosslinker in the resin generally resulted in greater ring-crush strength. However, the largest percentage increases in ring-crush strength over the experimental control occurred with amine crosslinker contents up to about 10%. Above 10% amine crosslinker, further increases in ring-crush strength were comparatively small; in fact, increasing the DETA amine crosslinker content in the bis-phenol A and 1,4-butanediol diglycidyl ethers from 10% to 50% actually resulted in a slight decrease in ring-crush strength. These results indicate that 10% amine crosslinker (resin "B") in these resins may represent a practical upper limit to the amount of resin "B" actually needed for excellent ring-crush resistance, at least for polyether-reinforced paperboards. Of course, since higher amounts of amine crosslinker also work well, the user can modify the relative amount of resin "B" to resin "A" to achieve maximal strength at least cost.

It was also noted that generally greater crush resistance was obtained when resin "A" comprised a diglycidyl ether (Examples 9–22) rather than a monoglycidyl ether (Examples 1–8). The exception was bis-phenol A diglycidyl ether/TETA (examples 21–22), which yielded data similar to the monoglycidyl-ether compositions. The reason for this is unclear, but may be related to the use of TETA as a hardener in examples 21–22 rather than DETA. DETA mixed with bis-phenol A diglycidyl ether (Examples 9–12) yielded ring-crush values that were appreciably higher.

It should be kept in mind that, in contrast with conventional epoxy resins, resin "A" as used according to the present invention is substantially non-prepolymerized. That is, resin "A" is not comprised of oligomers. Thus, large amounts of resin "B," up to about 50%, do not generally cause a significant decline in crush-strength. Thus, a cured mixture of resins "A" and "B," even mixtures containing 50T resin "B, " appear to have a lower crosslink density than cured conventional epoxy resins.

Turning now to the foldability data (Table I), it was noticed that individual data varied as much as 50% from the sample means. (Sample-mean data are presented in the "Fold" column of Table I.) Because of the variability of the data, the only general conclusion that can be drawn is that reinforcing paperboard web with epoxy resin according to the present invention did not significantly degrade the foldability of the material, compared to the untreated controls.

Figure 2:
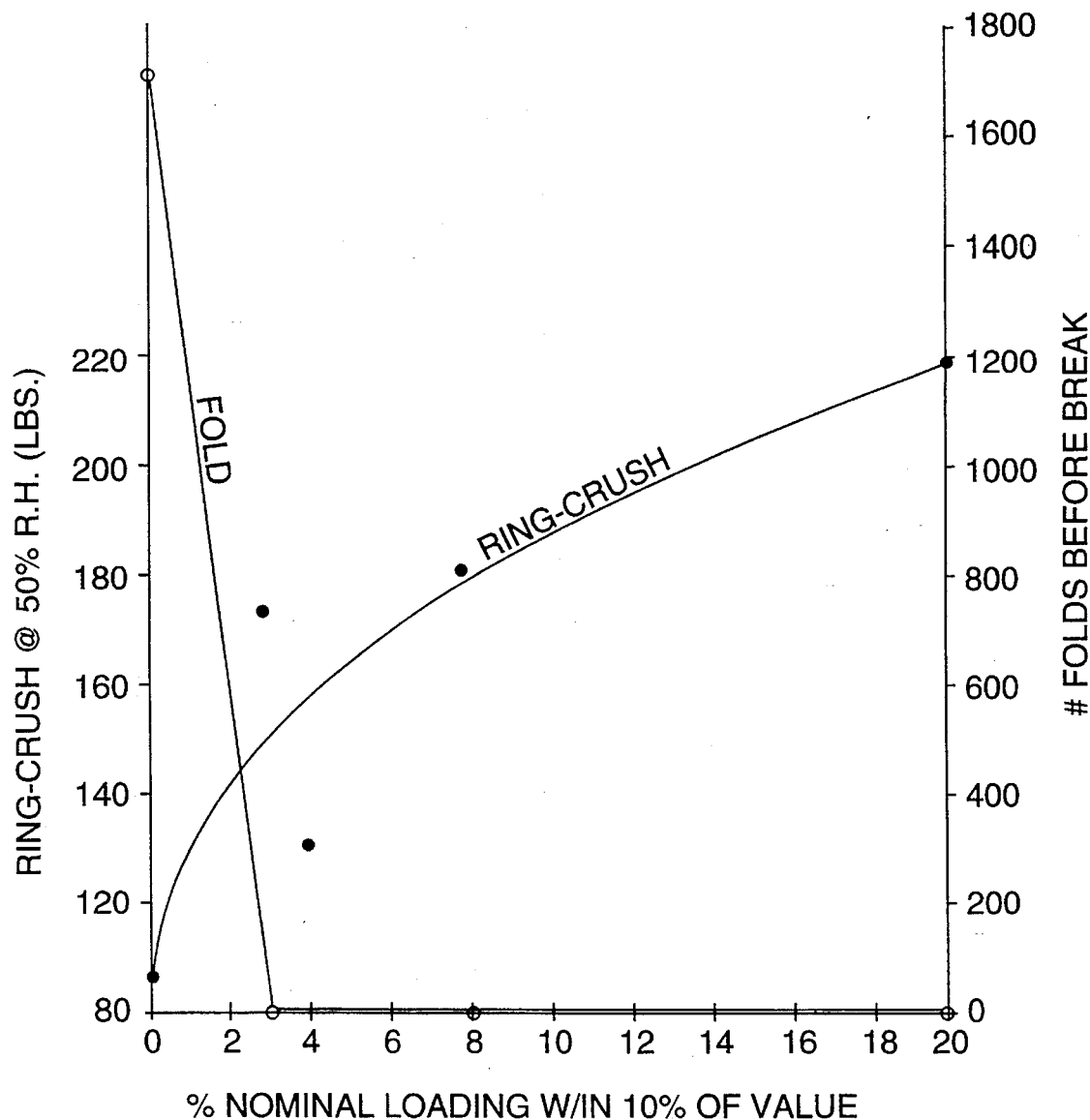
FIG. 2 shows plots of ring-crush strengths and foldabilities of prior-art polyether-reinforced paperboards as a function of loading level.

Thus, when the fold-resistance and crush-resistance data are considered in combination, the data of Examples 1–23 indicate that reinforcing fiberboard webs with polyether according to the present invention yields not only an appreciable increase in crush resistance of the web but also no significant decrease in fold-resistance over untreated controls. Use of a substantially non-prepolymerized resin "A" was important in achieving these surprising results. Foldability data (FIG. 2) obtained with similar webs treated with a bis-phenol A glycidyl epoxy resin that had been prepolymerized indicated that foldability decreased precipitously to zero even with only 3% loading. The ring-crush data of FIG. 2, however, indicates that crush resistance was about the same, at about 5% loading level, as the data shown in FIG. 1.

Table I also includes a column containing "Caliper mL" data which pertain to measured thicknesses of the corresponding polyether-treated paperboards. Each datum represents a sample mean where n=10. In view of the fact that the untreated control (Example 23) had a mean thickness of 9.7 mils, it appears that a small amount of compaction (compression) in the thickness dimension occurred with the polyether-treated samples (Examples 1–22).

Various polyether-treated paperboards from Examples 1–23 were also investigated to determine how deeply the corresponding mixtures of resins "A" and "B" penetrated into the thickness dimensions of the paperboards. The penetration-depth values (expressed as a fraction of total thickness of the treated web) were determined by cutting the treated webs after the webs were cured and examining the cut edges using a light microscope. Data are presented in Table II.

TABLE II

| Example | Resin "A" Parts | | | | Resin "B" Parts | | Penetration Depth | % Loading |
|---|---|---|---|---|---|---|---|---|
| | E1 | E2 | E3 | E4 | DETA | TETA | | |
| 3 | 90 | | | | 10 | | ⅓ | 7.2 |
| 4 | 50 | | | | 50 | | ½ | 6.0 |
| 7 | | 90 | | | 10 | | ¼ | 4.5 |
| 8 | | 50 | | | 50 | | ¼ | 6.0 |
| 11 | | | 90 | | 10 | | ¼ | 4.8 |
| 12 | | | 50 | | 50 | | <¼ | 4.9 |
| 13 | | | | 99 | 1 | | ½ | 4.8 |
| 14 | | | | 97 | 3 | | ½ | 5.1 |
| 15 | | | | 90 | 10 | | ⅓ | 5.2 |
| 16 | | | | 50 | 50 | | ¼ | 5.1 |
| 17 | | | 48.5 | 34 | 3 | | ½ | 5.6 |
| 18 | | | 48.5 | 34 | 50 | | ¼ | 5.3 |
| 19 | | 25 | 17.5 | | 3 | | ⅓ | 5.6 |
| 20 | | 25 | 17.5 | | 50 | | ¼ | 4.7 |
| 22 | | 50 | | | | 50 | <¼* | 4.8 |

E1 = Butyl glycidyl ether
E2 = 2-Ethylhexyl glycidyl ether
E3 = Diglycidyl ether of bis-Phenol A
E4 = Diglycidyl ether of 1,4-butanediol
DETA = Diethylenetriamine
TETA = Triethylenetetramine
*Thick layer of epoxy remained on surface The data of Table II indicate that adding more hardener (resin "B") causes the resulting mixture of resins "A" and "B" to penetrate a lesser distance into the thickness dimension of the web at a given loading level. This may be because a greater amount of hardener results in a more rapid rise in viscosity of the applied mixture of resins such that the mixture rapidly becomes too viscous after application to the fiberboard to readily penetrate further into the web. Also, TETA appears to cause more rapid curing than DETA. A comparison of examples 12 and 22 indicates that this is so, particularly since a thick layer of epoxy remained on the surface of the web in Example 22.

While the invention has been described in connection with preferred embodiments and multiple examples, it will be understood that it is not limited to those embodiments. On the contrary, it is intended to cover all alternatives, modifications, and equivalents as may be included within the spirit and scope of the following claims.

I claim:

1. A reinforced fibrous material, comprising a first fibrous sheet having an obverse face, a reverse face parallel to the obverse face, a sheet thickness dimension extending between the obverse and reverse faces, and a polyether-impregnated stratum extending parallel to the obverse and reverse faces and located within the sheet thickness dimension, the stratum having a stratum thickness dimension controlled to be no greater than about one-half the sheet thickness dimension such that a portion of the sheet thickness dimension is unimpregnated with polyether so as to confer an increased combination of ring crush strength and flexibility to the fibrous material compared to an otherwise similar material lacking the polyether-impregnated stratum, the polyether being formed by a polymerization reactioD involving an epoxy resin comprising molecules having a terminal glycidyl group and a hardening or curing agent, the resin mixture having a viscosity of less than 500 centipoise and the first fibrous sheet containing the polvether is formed into corrugated medium.

2. A material as recited in claim 1 wherein the fibers of the first fibrous sheet are selected from a group consisting of woven and non-woven fibers.

3. A material as recited in claim 1 wherein the fibers of the first fibrous sheet are selected from a group consisting of hydrophilic fibers, hydrophobic fibers, and mixtures of hydrophobic and hydrophilic fibers.

4. A material as recited in claim 3 wherein the fibers of the first fibrous sheet comprise wood-pulp fibers.

5. A material as recited in claim 4 wherein the first fibrous sheet is a paperboard.

6. A material as recited in claim 5 wherein the polyether-impregnated stratum comprises polyether at a loading level no greater than about 10% w/w relative to the mass of the paperboard.

7. A material as recited in claim 6 wherein the paperboard has a basis weight of about 42 pounds and the polyether-reinforced fibrous material has a ring-crush strength greater than about 100 pounds at 50 percent relative humidity when tested according to TAPPI T818-OM-87.

8. A material as recited in claim 7 having a foldability, when said material is tested according to TAPPI T511-OM-83, substantially the same as an untreated control paperboard having a basis weight of about 42 pounds.

9. A material as recited in claim 1 wherein the thickness dimension of the polyether-impregnated stratum extends from the obverse face into the thickness dimension of the sheet.

10. A material as recited in claim 1 wherein the first fibrous sheet comprises a first polyether-impregnated stratum having a first-stratum thickness dimension extending from the obverse face into the sheet thickness dimension, and a second polyether-impregnated stratum having a second-stratum thickness dimension extending from the reverse face into the sheet thickness dimension the first- and second-stratum thickness dimensions beinq controlled so as to provide an unimpregnated stratum between the first and second polyether-impregnated strata.

11. A material as recited in claim 1 further comprising a second fibrous sheet coextensive with the first fibrous sheet, wherein the second fibrous sheet has an obverse face, a reverse face parallel to the obverse face, and a thickness dimension extending between the obverse and reverse faces, and wherein the obverse face of the first fibrous sheet is adhered to the reverse face of the second fibrous sheet.

12. A material as recited in claim 11 wherein the second fibrous sheet has a polyether-impregnated stratum of fibers extending parallel to the obverse and reverse faces of the second fibrous sheet and located within the thickness dimension of the second fibrous sheet, the polyether-impregnated stratum having a stratum thickness dimension controlled to be less than the thickness dimension of the second fibrous sheet such that a portion of the thickness dimension of the second fibrous sheet is unimpregnated with polyether.

13. A material as recited in claim 11 wherein the first fibrous sheet is a medium paperboard and the second fibrous sheet is a linerboard.

14. A carton blank made from the material of claim 1.

15. A carton made from the material of claim 1.

16. A reinforced fibrous material. comprising a first fibrous sheet having an obverse face, a reverse face parallel to the obverse face, a sheet thickness dimension extending between the obverse and reverse faces, and a polyether-impregnated stratum extending parallel to the obverse and reverse faces and located within the sheet thickness dimension, the stratum having a stratum thickness dimension controlled to be no greater than about one-half the sheet thickness dimension such that a portion of the sheet thickness dimension is unimpregnated with polyether so as to confer an increased combination of ring crush strength and flexibility to the fibrous material compared to an otherwise similar material lacking the polyether-impregnated stratum, the polyether being formed by a polymerization reaction involving an epoxy resin comprising molecules having a terminal glycidyl group and a hardening or curing agent, the resin mixture having a viscosity of less than 500 centipoise and the first fibrous sheet containing the polyether is formed into corrugated medium;

wherein the first fibrous sheet comprises a first polyether-impregnated stratum having a first-stratum thickness dimension extending from the obverse face into the sheet thickness dimension, and a second polyether-impregnated stratum having a second-stratum thickness dimension extending from the reverse face into the sheet thickness dimension the first- and second-stratum thickness dimensions being controlled so as to provide an unimpregnated stratum between the first and second polyether-impregnated strata; and wherein the first- and second-stratum thickness dimensions are each controlled to be no greater than about one-third the sheet thickness dimension.

17. A reinforced fibrous material, comprising a first fibrous sheet having an obverse face, a reverse face parallel to the obverse face, a sheet thickness dimension extending between the obverse and reverse faces, and a polyether-impregnated stratum extending parallel to the obverse and reverse faces and located within the sheet thickness dimension, the stratum having a stratum thickness dimension controlled to be no greater than about one-half the sheet thickness dimension such that a oortion of the sheet thickness dimension is impregnated with polyether so as to confer an increased combination of ring crush strength and flexibility to the fibrous material compared to an otherwise similar material lacking the polyether-impregnated stratum, the polyether being formed by a polymerization reaction involving an epoxy resin comprising molecules having a terminal glycidyl group and a hardening or curing agent, the resin mixture having a viscosity of less than 500 centipoise;

the material further comprising a second fibrous sheet coextensive with the first fibrous sheet, wherein the second fibrous sheet has an obverse face, a reverse face parallel to the obverse face, and a thickness dimension extending between the obverse and reverse faces, and wherein the obverse face of the first fibrous sheet is adhered to the reverse face of the second fibrous sheet; and the material further comprising a third fibrous sheet coextensive with and adhered to the reverse face of the first fibrous sheet, wherein the third fibrous sheet is a linerboard, and wherein the first fibrous sheet is a corrugated medium paperboard including a first polyether-immreqDated stratum having a first-stratum thickness dimension extendinq from the obverse face into the sheet thickness dimension, and a second polyether-impregnated stratum having a second-stratum thickness dimension extending from the reverse face into the sheet thickness dimension the first and second-stratum thickness dimensions being controlled. so as to provide an unimpregnated stratum between the first and second polyether-impregnated strata.

18. A reinforced paperboard comprising:

a first paperboard ply having an obverse face, a reverse face parallel to the obverse face, and a ply thickness dimension extending between the obverse and reverse faces; and a second paperboard ply coextensive with and adhered to the first paperboard ply, the second paperboard ply having an obverse face, a reverse face parallel to the obverse face, and a ply thickness dimension extending between the obverse and reverse faces, wherein at least the second one of said paperboard plies has on at least one of the obverse and reverse faces thereof a polyether-impregnated stratum coextensive with the corresponding face and having a stratum thickness dimension extending depthwise from the corresponding face into the corresponding ply thickness dimension, the stratum thickness dimension being controlled to be no greater than about one-half the corresponding ply thickness dimension, wherein a portion of the Corresponding ply thickness dimension is unimpregnated with polyether so as to confer an increased combination of ring crush strength and flexibility to the paperboard compared to an otherwise similar material lacking the polyether-impregnated stratum, the polyether being formed by a polymerization reaction involving an epoxy resin and a curing agent, the epoxy resin comprising molecules each having a terminal glycidyl group, the resin mixture having a viscosity of less than 500 centipoise;

the reinforced paperboard further comprising a third paperboard ply coextensive with and adhered to the second paperboard ply; and wherein the first and third paperboard plies are linerboards and the second paperboard ply is a corrugated medium paperboard interposed between the first and third paperboard plies.

19. A reinforced paperboard as recited in claim 18 wherein each of said first and second plies has on at least one of said obverse and reverse faces thereof a polyether-impregnated stratum coextensive with the corresponding face and having a stratum thickness dimension extending depthwise from the corresponding face into the corresponding ply thickness dimension, each stratum thickness dimension beinq controlled to be no greater than about one-half the corresponding ply thickness dimension, wherein a portion of the corresponding ply thickness dimension is unimpregnated with polyether.

20. A reinforced paperboard as recited in claim 19 wherein the first ply is a linerboard and the second ply is a medium paperboard.

21. A reinforced paperboard as recited in claim 20 wherein the medium paperboard is corrugated.

22. A carton blank made from the material of claim 18.

23. A carton made from the material of claim 18.

* * * * *